UNITED STATES PATENT OFFICE.

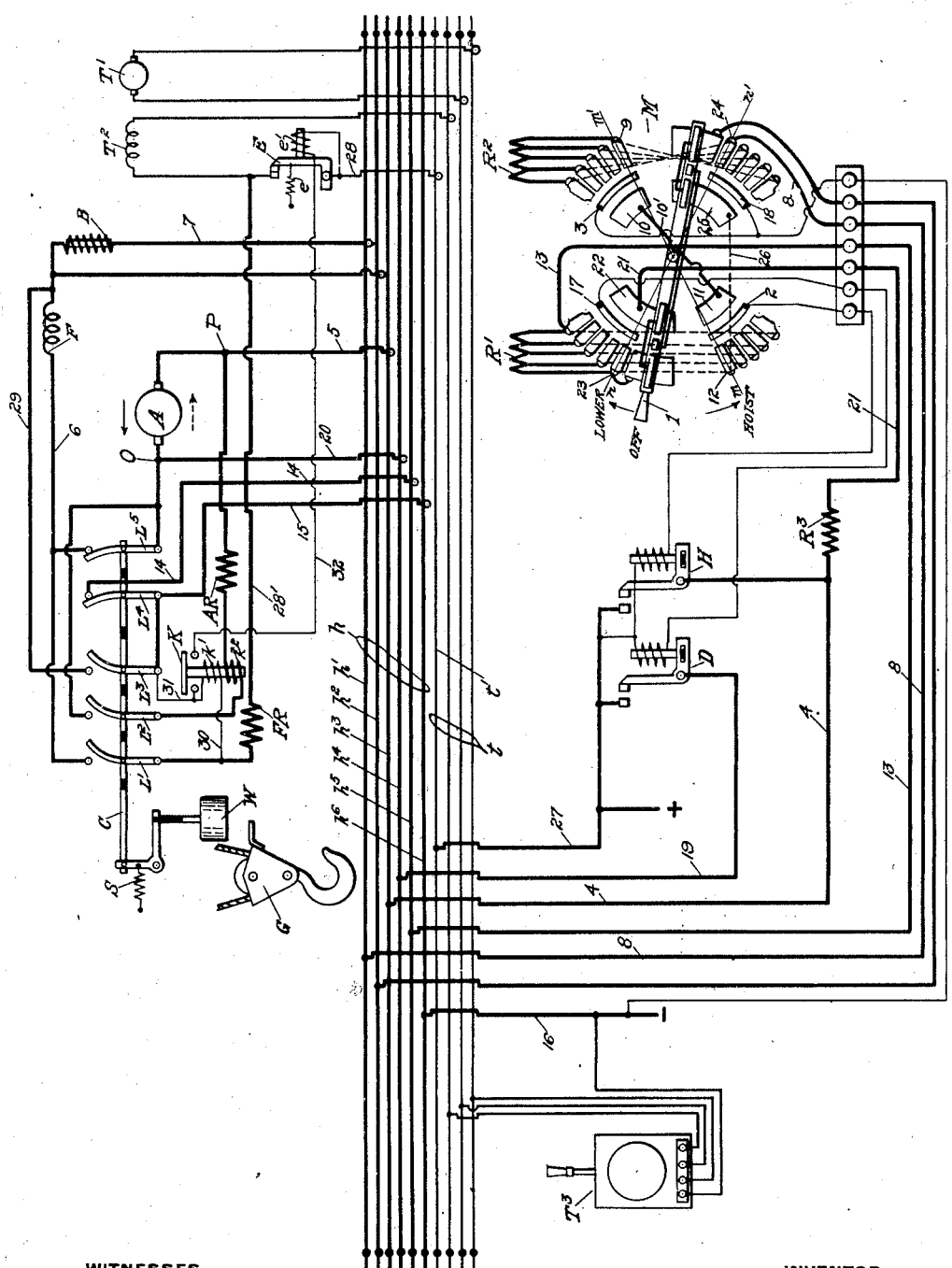

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

MOTOR-CONTROL SYSTEM.

1,080,146.  Specification of Letters Patent.  Patented Dec. 2, 1913.

Application filed March 18, 1913. Serial No. 755,140.

*To all whom it may concern:*

Be it known that I, JAY H. HALL, a citizen of the United States, residing at Cleveland, in the county of Cuyahoga and State of Ohio, have invented new and useful Improvements in Motor-Control Systems, of which the following is a specification.

My invention relates to systems of electric motor control, in which a safety limit switch is used to stop the motor when the mechanism driven thereby has reached a certain limit of motion.

More particularly, it relates to systems for the control of motors for hoisting mechanisms, such as overhead traveling cranes, elevators, and the like, wherein it is desired to prevent the overtravel of the hoisting mechanism.

In the operation of electric overhead traveling cranes, it is customary to supply current to the hoist motor and cross-travel motor through trolley wires carried by the bridge girders of the crane. It is also customary to use a series-wound motor for the hoisting motor. In order to secure an effective stop of a series motor by dynamic braking, it is necessary to separately excite the series field, converting the motor into a shunt motor.

It may happen that an overtravel does not occur during a long period of time, perhaps several days or weeks, but when an overtravel does occur, it is absolutely essential that the safety circuits shall be intact to produce a quick stop. If one of the conductors for supplying current to the field winding for separately exciting it to produce dynamic braking of the hoist motor should be disconnected, no dynamic braking action would be secured. Similarly, if one of the trolley wheels included in one of these circuits should be off its respective wire, no dynamic braking action would result.

One of the objects of my invention is to provide a system wherein the motor armature is connected in a local dynamic braking circuit when an overtravel of the mechanism occurs, and the field winding is separately excited through a circuit independent of the operator's switch.

Another object is to provide circuits which the operator will know are intact for establishing the safety connections when an overtravel occurs.

Another object is to secure the positive release of the electric brake when the operator wishes to control the motor for returning the mechanism to its normal limit of travel.

Another object of my invention is to secure a reduction of current through the field circuit after the motor has been stopped by the limit switch, in order to prevent a loss of current and to prevent overheating of the resistance and the field winding in this circuit.

In carrying out my invention, I employ a limit switch operated by the hoisting mechanism, having a plurality of contacts, a part of which are normally closed and a part normally open. Such a switch is described in Wright and Stratton's application, Serial Number 728,682. To reduce the current in the field circuit, I employ a magnetically-operated switch normally closed by a spring or other means, and controlled by a relay, the operation of which I will explain presently.

Referring to the accompanying drawing, which illustrates my invention diagrammatically, the hoisting motor is indicated by the armature A and the series field F. The electric brake B is arranged to have its winding connected in series with the motor in order that the brake may be released when the motor is supplied with current. The hoisting motor may be supposed to operate a mechanism for raising and lowering the hook-block G. The limit switch for controlling the motor when the hook-block G has reached a certain limit of travel is indicated as having the normally open contacts $L'$, $L^2$, $L^3$, and the normally closed contacts $L^4$ and $L^5$. These contacts are held in their normal positions by the weight W by means of a bell crank and the connecting-rod C. When the hook-block overtravels, the weight W is lifted, and the switches are moved to their operating positions by the spring S or other suitable means.

The hoisting motor is controlled by means of the controller M, and current is supplied to the motor through the trolley wires $h$. The cross travel motor for the crane is indicated by the armature $T'$ and the series field $T^2$. This motor is controlled by the usual reversing controller $T^3$, the current being supplied to the motor through the trolley wires $t$. In the system shown, the hoist motor is controlled by the system described in Eastwood and Schnabel's Patent, No. 984,651, in which the armature and field are connected in series with each other for the hoisting motion, and the armature and field are connected in parallel with each other for the lowering motion. It will be understood that other systems for operating the motor can be used.

When it is desired to hoist the load, the operator moves the controller arm 1 to the position $mm'$. The switch H immediately closes, its winding being supplied with current through the contacts 2 and 3 and the bridging contacts on the arm 1. Current now flows from positive through the switch H, the wire 4, the trolley wire $h^3$, the wire 5, the armature A in the direction of the solid arrow, the switch $L^5$, the wire 6, the series field F, the brake winding B, the wire 7, the trolley wire $h'$, the wire 8, the contact 24, the cross-connection on the controller M, the resistance $R^2$, the contact 9, the contact arm, the contact 10, the cross-connection 10' to the contact 11, the contact arm to the contact 12, the cross-connection on the controller M, the resistance $R'$, the wire 13, the trolley wire $h^5$, the wire 14, the switch $L^4$, the wire 15, the trolley wire $h^6$, and the wire 16 to the negative. The brake winding releases the brake, and the motor starts in the hoisting direction, the speed being regulated by the variation of the resistances $R'$ and $R^2$ by means of the controller arm 1 in a manner readily understood.

To run the motor in the lowering direction, the operator moves the controller arm 1 to the position $nn'$. In this position the switch D closes, its winding being energized through the controller contacts 17 and 18 and the bridging contacts on the arm 1. The motor circuit is established thereby as follows: from the positive through the switch D, the wire 19, the trolley wire $h^4$, and the wire 20 to the point O. Here the circuit divides, one branch passing through the armature in the direction of the dotted arrow, the wire 5, the trolley wire $h^3$, the wire 4, the resistance $R^3$, the wire 21, the segment 22, the contact arm, the contact 23, the resistance $R'$, the wire 13, the trolley wire $h^5$, the wire 14, the switch $L^4$, the wire 15, the trolley wire $h^6$, and the wire 16 to the negative.

The other branch of the circuit passes from the point O through the switch $L^5$, the wire 6, the field winding F, the brake winding B, the wire 7, the trolley wire $h'$, the wire 8, to the contact 24, the controller arm 1, the segment 25, the cross-connection 26, the contact 12, and the cross-connection to the contact 23, where this branch of the motor circuit reunites with the other branch. The armature and field are connected in parallel circuits, but the current flows through the armature in a direction opposite to that in hoisting, and the motor therefore runs in the opposite direction.

The speed of the motor may be increased by varying the amount of the resistance $R'$ and $R^2$ in the armature and field branches of the circuit, all of which is explained in Patent No. 984,651.

When the controller arm 1 is moved to the "off" position, the brake winding B is deënergized and the switch D opens its contacts; but the armature and field windings remain connected in a dynamic braking circuit including the resistance $R^3$, which causes the motor to quickly come to rest.

When the motor is connected either for hoisting or for lowering, the motor current is carried through the contacts $L^4$ and $L^5$ of the limit switch. If, while the motor is hoisting, the hook-block G should overtravel, the switches $L^4$ and $L^5$ will be opened and the motor will be cut off from the source of current supply through the controller M. The lifting of the weight W by the overtravel of the hook-block G also causes the closure of the switches $L'$, $L^2$, and $L^3$, which close a local dynamic braking circuit through the contacts $L^2$ and the resistance AR. The field F is separately excited by a circuit which is as follows: from the positive through the wire 27, the trolley wire $t'$, the wire 28, the normally closed switch E, the wire 28', the resistance FR, the contact $L'$, the wire 6, the field winding F, the wire 29, the contact $L^3$, the wire 15, the trolley wire $h^6$, and the wire 16 to the negative. The field is energized by this circuit directly from the source of supply, limited only by the resistance FR, and, consequently, the motor comes to rest quickly. These dynamic braking connections, including both the field and the armature, are entirely separate from any connections made on the controller M, so that the motor will be brought to rest in the quickest possible time, regardless of the position to which the operator moves the controller arm 1 when the limit switch operates.

In order to stop the motor quickly, it is desirable to fully excite the field winding. I, therefore, allow approximately full load current to flow through the branch circuit including the field winding and the resistance FR when the limit switch is operated by the upward movement of the hook-block. If the operator should allow the hook-block G to remain in the position of overtravel, a large current will continue to flow through the resistance FR and the field winding F, causing a considerable loss of current and the probable overheating of the resistance and field winding. In order to prevent this, I employ the magnetically-operated switch E, normally held closed by the spring $e$, and located preferably in the current supply circuit to the cross travel motor $T'$, $T^2$ and the circuit supplying current to the field winding F of the hoisting motor through the resistance FR. The switch E remains closed during the normal operation of the controller, and is arranged to be opened by exciting its winding $e'$, when the hoist motor has come to rest after the operation of the limit switch. For controlling the circuit of the winding $e'$, I employ a relay K, which is normally held in its open position by a shunt winding $k'$. The circuit of this winding is as follows: from the positive through the wire 27, the trollery wire $t'$, the wire 28, the switch E, the wire 28', the resistance FR, the wire 30, the winding $k'$ the wires 31 and 15, the trolley wire $h^6$ and the wire 16 to the negative. If there should be an accidental opening of this circuit, for example, in the winding $k'$ or in the resistance FR, the relay will close its contacts, whereupon the winding $e'$ of the switch E will be energized through the following circuit: from the positive through the wire 27, the trolley wire $t'$, the wire 28, the winding $e'$, the wire 32, the contacts of the relay K, the wires 31 and 15, the trolley wire $h^6$ and the wire 16 to the negative. The switch E will open its contacts and open the circuit of the cross-travel motor, which indicates to the operator that something is wrong. I provide on the relay K a second winding $k^2$, included in the dynamic braking circuit through the armature A and resistance AR. When the limit switch operates upon an overtravel of the hook-block G, the winding $k^2$ becomes energized by the dynamic braking current through the contact $L^2$. At the same time the winding $k'$ is deënergized upon the closure of the switches L' and $L^3$, since it is shunted by the low resistance circuit through the field winding F. The dynamic braking current flowing in the winding $k^2$ maintains the relay contacts open until the motor has come to rest, whereupon the winding $k^2$ is deënergized and the relay closes its contacts and causes the switch E to open. This opens the circuit through the resistance FR and the field winding F, which is desirable as soon as the motor stops. The switch E may be used to insert a resistance in the circuit, instead of opening it, if so desired. The only trolley wires in use during this dynamic braking connection for the safety stop are the trolley wires $h^6$ and $t'$. The trolley wire $h^6$ was just previously in use during the hoisting of the motor which caused the overtravel, and must therefore be intact. The trolley wire $t'$ is one which furnishes the positive connection to the cross travel motor T', $T^2$, which must have been intact at the last time the cross travel motor was in use.

After an overtravel has occurred, and the motor has been stopped by the operation of the limit switch, all that is necessary for the operator to do to move the hook-block back to its normal operating region is to move the controller contact arm 1 to the lowering position, whereupon a circuit for operating the motor in the lowering direction until the limit switch has been moved by the weight W to its normal position will be established as will now be described. The switch D closes, as hereinbefore described, and the motor current flows from the positive through the switch D, the wire 19, the trolley wire $h^4$, the wire 20, the point O, and the armature A in the direction of the dotted arrow to the point P. From the point O, a portion of the current flows through the contact $L^2$, the relay winding $k^2$, and the resistance AR in parallel with the armature A and to the point P where the two branch circuits unite. The current in the united circuits flows from the point P through the wire 5, the trolley wire $h^3$, the wire 4, the resistance $R^3$, the wire 21, the contact 22, the contact arm 1, the contact 23, the cross-connection to the contact 12, the cross-connection 26, the contact 25, the contact arm 1, the contact 24, the wire 8, the trolley wire $h'$, the wire 7, the brake winding B, the wire 29, the contact $L^3$, the wire 15, the trolley wire $h^6$, and the wire 16 to the negative. The current in the winding $k^2$ of the relay causes the relay K to open its contacts, whereupon the switch E immediately closes by the action of the spring $e$. The field F is supplied with current through the contacts L' and $L^3$ of the limit switch, as already explained in the description of the circuits which exist when these contacts are closed. The motor will, therefore, run in the lowering direction until the hook-block G has been lowered sufficiently for the weight W to permit the return of the limit switch to its normal position which is as shown on the drawing. When the limit switch reaches this normal position, the control of the motor is restored to the operator's controller M.

To insure safety, the switch E is preferably of the normally closed type, as shown. It will be readily understood, however, that a switch closed by a magnet, or any other type of switch and relay, can be used without departing from the spirit of my invention as set forth in the following claims.

I claim—

1. In a control system for electric hoists, a hoist motor, a cross-travel motor, a controller for each motor, trolley wires through which current is supplied to operate the two motors from the controllers, and a switching device for stopping the hoist motor comprising means for connecting the motor in a dynamic braking circuit exclusive of the controller therefor but including at least one of the said operating trolley wires for each motor.

2. In a motor control system, a hoisting mechanism, a motor for operating the hoisting mechanism, a controller and a field winding therefor, a cross-travel motor for the hoisting mechanism, circuits for both motors including trolley wires, and a stopping device for the hoist motor for connecting the armature in a closed circuit and for exciting the said field winding through a circuit exclusive of the controller, but inclusive of some of the trolley wires normally used in the operation of both motors.

3. In a motor control system, a hoisting mechanism, a motor for operating the mechanism, a cross travel motor for the mechanism, circuit connections for operating both motors, and means operated by the hoist motor for connecting the armature of said motor in a closed circuit and connecting the field to a source of supply through a circuit including one of the operating circuit connections of each motor.

4. In a motor control system, a hoisting mechanism, a motor therefor having a series field, a controller for the motor, and means operated by the motor for connecting the armature in a closed circuit, for opening the circuit connecting the field to the source through the controller, and for connecting the field to the source through conductors previously used in the control of the hoisting mechanism.

5. In a control system for electric hoists, a motor having a field and an armature, a controller and connections for connecting the armature and field to the source of supply in series with each other to run the motor in the hoisting direction, connections for connecting the armature and the field in parallel with each other to run the motor in the lowering direction, and means operated by the motor in hoisting for disconnecting the source from the field through the controller, for connecting the field to the source through a circuit not including the controller, and for connecting the armature in a closed circuit.

6. In a control system for electric hoists, a motor having a field and an armature, a brake winding for releasing a brake, a controller for connecting the armature and the field and brake windings in series to run the motor in the hoisting direction and for connecting the armature and field in parallel paths for running the motor in the lowering direction, means operated by the motor in hoisting for connecting the motor in a dynamic braking circuit, and means for connecting the armature to the source through the brake winding when the controller is moved to the lowering position.

7. In a motor control system, a motor, a brake winding, a reversing controller for the motor, a device operated by the motor comprising means for opening the motor circuit through the controller, means for closing a shunt around the motor armature, means for closing a circuit through the motor field, means for opening the circuit through the brake winding, and means for directing the current supplied to the armature through the brake winding when the controller is reversed.

8. In a system for electric motors, a motor having a field and armature, a reversing controller therefor, a resistance for the motor, and a stopping device comprising a switch for closing a shunt around the armature, a switch for disconnecting the armature from the field, a switch for disconnecting the resistance from the source and means for connecting the field to the source.

9. In a system for electric motors, a motor having a field and armature, a reversing controller therefor, a brake winding for the motor, and a stopping device comprising a switch for closing a shunt around the armature, a switch for disconnecting the armature from the field, a switch for disconnecting the brake winding from the source, and means for connecting the field to the source.

10. In a system for electric motors, a motor having a field and armature, a reversing controller therefor, and a stopping device comprising a switch for closing a shunt around the armature, a switch for disconnecting the armature from the field, a switch for disconnecting the controller from the system and means for connecting the field to the source.

11. In a system for electric motors, a motor having a field and aramature, a reversing controller therefor, a brake winding in series with the field, and a stopping device comprising a switch for closing a shunt around the armature, a switch for disconnecting the armature from the field, a switch for disconnecting the brake winding from the source, and a pair of contacts for connecting the field to the source, one of said contacts connecting the brake winding in the armature circuit when the controller is reversed.

12. In a system of control for electric hoists, a hoisting mechanism, a motor therefor, a controller for the motor, and a switching device for stopping the motor comprising means for opening the motor circuit between the motor and the controller, means for closing a local circuit through the motor armature, and means for supplying current through the field exclusive of the controller but through conductors previously used in the operation of the hoisting mechanism.

13. In a motor control system, a motor, a switching device operated by the motor for energizing the field and connecting the armature in a closed circuit, a switch in the field circuit, and means controlled by the current in the armature circuit for operating the switch.

14. In a motor control system, a motor, a controller therefor, means operated by the motor for closing a dynamic braking circuit exclusive of the said controller, and means controlled by the current in the armature for controlling the current through the field.

15. In a motor control system, a motor having a series field winding, a controller for the motor, a switching device for separately exciting the series field and connecting the motor armature in a closed circuit, and means automatically operated for opening the circuit through the field when the motor stops.

16. In a motor control system, a motor having an armature and a field, a controller therefor, a switching device operated by the motor for energizing the field and connecting the armature in a closed circuit, a switch in the field circuit, and means for controlling said switch comprising a relay having a winding in the closed circuit through the armature.

17. In a motor control system, a motor having an armature and a field, a controller therefor, a switching device operated by the motor for energizing the field and connecting the armature in a closed circuit, a switch in the field circuit, means for controlling said switch comprising a relay having a winding in the closed circuit through the armature, and a winding normally energized to hold the relay open.

18. In a motor control system, a hoisting mechanism, a motor therefor having a series field, a controller for the motor, means operated by the motor for connecting the armature in a closed circuit, for opening the circuit connecting the field to the source through the controller, and for connecting the field to the source through conductors previously used in the control of the hoisting mechanism, a switch in one of said conductors, and means controlling the opening of said switch when the speed of the motor has diminished.

19. In a system for electric motors, a motor having a field and armature, a controller for connecting the motor to a source of supply, a stopping device comprising contacts for disconnecting the motor from the source through the controller, contacts for closing a shunt around the armature, and contacts for connecting the field to a source of supply, and means automatically operated for reducing the current through the field when the motor stops.

Signed at Cleveland, Ohio, this 15th day of March, A. D. 1913.

JAY H. HALL.

Witnesses:
 RUTH H. BENNETT,
 H. M. DIEMER.